July 20, 1926.
F. W. GRISWOLD
CABLE CLAMP
Filed Dec. 13, 1924
1,593,069
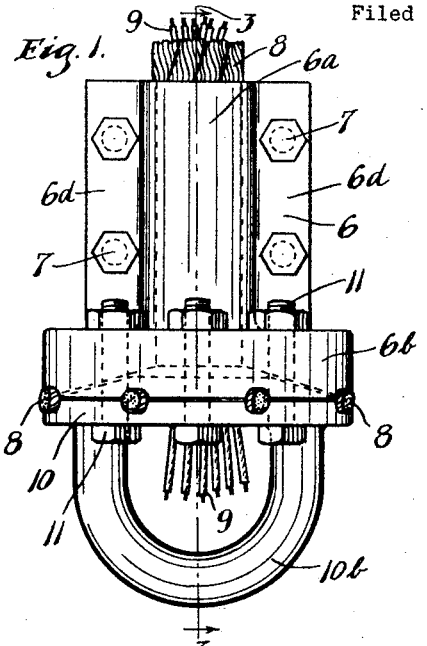
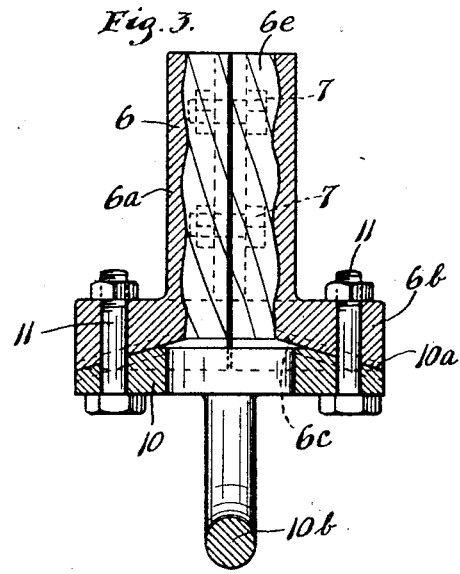
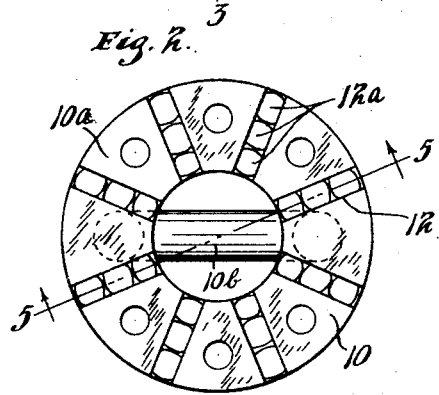
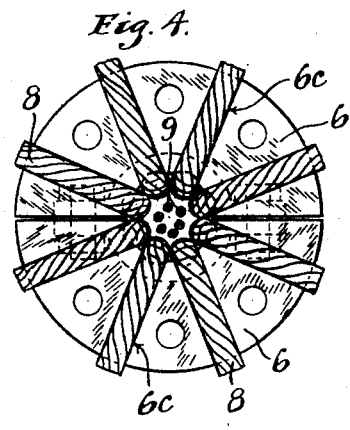
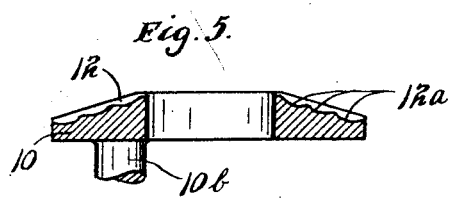
INVENTOR.
FRANK W. GRISWOLD.
BY HIS ATTORNEY.

Patented July 20, 1926.

1,593,069

UNITED STATES PATENT OFFICE.

FRANK W. GRISWOLD, OF MINNEAPOLIS, MINNESOTA.

CABLE CLAMP.

Application filed December 13, 1924. Serial No. 755,659.

This invention relates to a clamp and particularly to a clamp adapted to clamp a cable such as the well known twisted wire cable. While the clamp of the present invention may be used to clamp various types of cables it is particularly designed to clamp a cable having passing through the center thereof one or more flexible members so that a passage is afforded for said members through the clamp. One particular use of the clamp has been for securing a cable forming part of a tensioning means for a signal post, which post has a bail at its base supported upon suitable members and which is adapted to swing laterally in all directions. It is necessary to have electrical conductors passing into the post and quite a problem was presented in arranging these conductors so that the same would not be chafed by the clamping of the cable and the swinging movement of the post. A special cable was therefore made having a passage through the center thereof in which the conductors were disposed and the present clamp has been used to clamp such a cable.

It is an object of this invention, therefore, to provide a clamp comprising a plurality of members adapted to be secured together, which members are formed to have a passage therethrough when so secured together in which a cable is clamped.

It is another object of the invention to provide such a clamp as set forth in the preceding paragraph in which the members forming the clamp have laterally projecting portions co-operating on their lower sides to form a substantially annular surface, together with a member adapted to be connected to said members opposite said surface and to clamp the separated and diverging strands of the cable against said surface.

It is another object of the invention to provide a clamp comprising a plurality of members having means for connecting and clamping the same in assembled position which members have a passage therethrough in which the cable is clamped and which also have means for clamping the separated and diverging strands of the cable.

It is still further an object of the invention to provide a clamp comprising a plurality of members adapted to be secured or clamped together and having a passage therethrough in which the cable is clamped, together with a member adapted to be secured or clamped to said members for clamping the individual strands of the cable, which latter member is provided with a bail.

These and other objects and advantages of the invention will be fully set forth in the following description made in connection with the accompanying drawings in which like reference characters refer to the same parts throughout the different views, and in which, Fig. 1 is a view in side elevation of the clamp showing a portion of the cable therein and the conductors in said cable;

Fig. 2 is a top plan view of the lower member of the clamp;

Fig. 3 is a central vertical section taken on the line 3—3 of Fig. 1;

Fig. 4 is a bottom plan view of the clamp with the lower member removed showing the strands of the cable in place; and Fig. 5 is a central vertical section taken on the line 5—5 of Fig. 2.

Referring to the drawings, the clamp is shown as comprising a plurality of members 6, which members are illustrated as two in number, each of which has a central semi-cylindrical portion $6^a$ with a semi-cylindrical passage therethrough, and each of which has a semi-circular flange portion $6^b$ at one end projecting laterally substantially at right angles to the axis of the semi-cylindrical portion $6^a$. The flange portions $6^b$ have flat surfaces at one side disposed in a plane at right angles to the axis of the portion $6^a$ and have inclined surfaces $6^c$ at their outer sides, which latter surfaces form substantially a concave frusto-conical surface. The members 6 also have projecting laterally therefrom along the portions $6^a$ flat flanges $6^d$ apertured to receive headed and nutted clamping and securing bolts 7. The clamp is particularly designed to clamp a cable 8 of the twisted wire type comprising a plurality of strands arranged in twisted or helical formation, each of which comprises a plurality of strands of wire arranged in twisted or helical formation. The members 6, when secured together, have a substantially cylindrical passage extending therethrough and the surface of this passage preferably is formed with helical grooves $6^a$ adapted to fit the strands of cable 8. It will be noted that the cable 8 has no center strand but is formed with a passage therethrough in which are disposed a plurality of insulated electrical wires or conduits 9.

The clamp also comprises a member 10 of annular form, thus having a central passage therein and one side of this member is formed with a convex frusto-conical surface 10ª corresponding to the surface 6ᶜ and arranged in opposite relation to said surface. The member 10 is of the same diameter as the flange portion 6ᵇ and said member and said flange portions are provided with a plurality of alining holes adapted to receive the headed and nutted clamping bolts 11 which secure the member 10 to the flanges 6ᵇ. The surfaces 6ᶜ and 10ª are provided with radial grooves 12 and the grooves are each provided with depressions 12ª forming ridges or ribs therebetween. The member 10 is also provided with a bail or loop member 10ᵇ substantially of U-shape, which spans the central opening therein.

The portions 6ª of the clamp are adapted to surround and clamp the body of the cable 8, as illustrated in Fig. 1 and, as stated, the grooves 6ᵉ will substantially fit the twisted strands of the cable. The strands of the cable are separated and arranged into grooves 12, as clearly shown in Figs. 1 and 4, and these separated and diverging strands are clamped between the flanges 6ᵇ and the member 10. With this clamping arrangement, the conductors 9 are free to pass through the clamp and pass out through the central opening in the member 10 to a desired location where they will be connected to a source of current. In the particular use of the device with a signal post the cable 8 passes upward into the post where it is clamped and the conductors 9 extend upward to the lamps in the post. The cable in said use is placed under great tension by strong springs and the same is anchored at the bottom by the bail member 10ᵇ, being disposed over a suitable hook firmly secured in the base. The cable is so constructed that the clamping pressure thereon does not affect the opening therethrough and by the clamping effect on the body of the cable and also on the separated strands the cable is very efficiently secured.

It will thus be seen that the conductors 9 will not be chafed or interferred with by any swinging movements of the cable.

From the above description it is seen that applicant has provided a simple and very efficient form of clamping device and one which will very effectively clamp such a cable as disclosed and at the same time permit passage of flexible members therethrough. The device is of simple construction and easily made and assembled. The same has been amply demonstrated in actual use and is being used commercially in large numbers.

It will, of course be understood that various changes may be made in the form, details, arrangement and proportions of the parts without departing from the scope of applicant's invention, which, generally stated, consists in a device cable of accomplishing the objects above set forth, in the novel parts and combinations of parts disclosed and defined in the appended claims.

What is claimed is:

1. A clamp for a cable having in combination, a plurality of members adapted to be secured together, each having means engaging and clamping the side of a cable and each having means disposed at an angle to said first mentioned means for engaging the separated and diverging strands of said cable, and an annular means co-operating with said last mentioned means and adapted to be clamped to said members for clamping the diverging strands of said cable.

2. A clamp for a cable comprising a plurality of members adapted to be secured together and having a substantially cylindrical passage therethrough when so secured adapted to receive a cable clamped by said members, said members also having laterally projecting portions at one end forming an annular surface, and a member having a passage therethrough alining with said passage and having a surface opposite the said last mentioned surface and co-operating therewith to clamp the individual strands of said cable.

3. A clamp for a cable having in combination, a plurality of members each having a cylindrical trough extending longitudinally thereof and having flanges at each side thereof, said flanges being adapted to receive securing means for holding said members in assembled position, said troughs forming a cylindrical passage adapted to receive and clamp a cable, said members also having laterally extending portions at one end forming a concave frusto-conical surface when said members are assembled, and an annular member having a convex frusto-conical surface opposite the said surface, and means for securing said member to said laterally projecting portions, the individual strands of said cable being clamped between said frusto-conical surfaces.

4. A clamp for a hollow cable having flexible members passing therethrough comprising a plurality of members adapted to be secured together, each having a semi-tubular portion with helical grooves on its interior surface adapted to fit and engage the side of a twisted wire cable, said semi-tubular portions, when the members are secured together, forming a substantially cylindrical passage in said cable, each portion having a laterally projecting flange having grooves in its outer faces, said grooves being adapted to receive the separate and diverging strands of said cable, and an annular member disposed opposite to said flanges and having grooves therein adapted to receive said separate and diverging strands, and means for clamping said latter member to said flanges to clamp said strands therebetween whereby said flexible members may pass through the clamp and through the said annular member.

5. A device for clamping a cable having a plurality of flexible members extending therethrough comprising a plurality of semitubular members adapted to fit against said cable, means for securing said members together to clamp said cable, each of said members having a laterally extending flange, said flanges adapted to form a substantially annular surface, an annular member disposed opposite said surface, and means for securing said annular member to said flanges to clamp the separate and diverging strands of the cable thereto, said flexible member passing through the last mentioned member, and a bail projecting from said last mentioned member.

6. A clamp for a cable having in combination, a plurality of members adapted to be secured together and to co-operate to embrace the sides of a cable and to clamp the same, and means abutting the ends of said members to clamp the individual strands of said cable between said means and the ends of said members.

In testimony whereof I affix my signature.

FRANK W. GRISWOLD.